(12) United States Patent
Abe et al.

(10) Patent No.: US 7,247,341 B2
(45) Date of Patent: Jul. 24, 2007

(54) METHOD FOR FORMING ELECTRODES OF FLAT PANEL DISPLAY

(75) Inventors: Noriyuki Abe, Chiba-ken (JP); Masaaki Oda, Chiba-ken (JP)

(73) Assignee: Ulvac, Inc., Kanagawa (JP)

( * ) Notice: Subject to any disclaimer, the term of this patent is extended or adjusted under 35 U.S.C. 154(b) by 568 days.

(21) Appl. No.: 10/432,608

(22) PCT Filed: Dec. 4, 2001

(86) PCT No.: PCT/JP01/10574

§ 371 (c)(1), (2), (4) Date: Jun. 3, 2003

(87) PCT Pub. No.: WO02/47054

PCT Pub. Date: Jun. 13, 2002

(65) Prior Publication Data

US 2004/0043691 A1     Mar. 4, 2004

(30) Foreign Application Priority Data

Dec. 4, 2000     (JP) .............................. 2000-368680

(51) Int. Cl.
*B05D 5/12* (2006.01)
*H01J 9/00* (2006.01)
(52) U.S. Cl. ........................ 427/64; 427/68; 427/77; 445/24; 445/35; 445/46
(58) Field of Classification Search ................ 427/64, 427/68, 77; 445/24, 35, 46
See application file for complete search history.

(56) References Cited

U.S. PATENT DOCUMENTS 5,922,403 A * 7/1999 Tecle ........................ 427/212
5,948,512 A * 9/1999 Kubota et al. ........... 428/195.1
6,153,348 A * 11/2000 Kydd et al. ................. 430/119
6,538,381 B1 * 3/2003 Ueoka et al. ............... 313/582
6,855,196 B2 * 2/2005 Kawamura et al. ........ 106/31.6

FOREIGN PATENT DOCUMENTS

| JP | 07-188599 | * | 7/1995 |
| JP | 02-561537 | * | 9/1996 |
| JP | 2561567 | | 9/1996 |
| JP | 11-273557 | * | 10/1999 |
| JP | 11-317152 A | | 11/1999 |
| JP | 2000-182889 | * | 6/2000 |
| JP | 2000-651866 | * | 9/2000 |

OTHER PUBLICATIONS

Japanese Search Report, PCT/ISA/210.

* cited by examiner

*Primary Examiner*—Brian K. Talbot
(74) *Attorney, Agent, or Firm*—Arent Fox LLP

(57) ABSTRACT

The present invention provides a method for forming an electrode of a flat panel display device using ink for ink jet printing and an ink jet printer. The ink for ink jet printing is prepared by a method comprising the first step of contacting the vapor of a metal with the vapor of the first solvent, according to the vapor phase-evaporation technique, to thus give a dispersion of metal ultrafine particles; the second step of adding a low molecular weight polar solvent as the second solvent to the dispersion prepared in the first step to thus precipitate the metal ultrafine particles and removing the first solvent; and the third step of adding the third solvent to the precipitates thus prepared to carry out the solvent substitution and to give a dispersion of independently dispersed metal ultrafine particles, and prepared by adding a dispersant in or during the foregoing first and/or third steps, and the ink for ink jet printing consists of a dispersion excellent in ink characteristic properties. In the dispersion, metal ultrafine particles having a particle size of not more than 100 nm are independently and uniformly dispersed. The electrodes of FPD devices are formed using this ink for ink jet printing.

14 Claims, No Drawings

METHOD FOR FORMING ELECTRODES OF FLAT PANEL DISPLAY

TECHNICAL FIELD

The present invention relates to a method for forming an electrode of a flat panel display (hereunder also referred to as "FPD"), which makes use of ink for an ink jet printer consisting of a dispersion containing independently dispersed metal ultrafine particles and a dispersant.

BACKGROUND OF ART

In fields such as colored paints and conductive paints, there have conventionally been used dispersions of metal ultrafine particles, but there has not yet been proposed any technique for forming an electrode for the FPD, which makes use of such a dispersion of metal ultrafine particles as ink and the ink jet printing system. The FPD includes a variety of display systems such as a liquid crystal display (LCD), a plasma display panel (hereunder also referred to as "PDP"), an organic EL display (EL) and a field-emission-display (FED), but the PDP will hereunder be described as a typical example thereof in the present invention.

The PDP has become of interest lately as a large-scale display for consumer products, but there has been desired the development of a technique, which permits the simplification of the production process for the PDP to achieve a considerable decrease in cost and to thus popularize the PDP worldwide. First of all, the production process thereof will be described below while taking, as an example, the production of a color PDP for 42-inch high vision. This production process comprises the steps of preparing two kinds of panels of a front panel and a back panel. The electrode for the front panel is referred to as "a scanning electrode" and ITO transparent electrodes are formed on a glass plate at a density of 2 linear electrodes per one picture element for 1024 picture elements. The resistance value of the transparent electrode in itself is too high and thus a bus electrode (metal) is in general formed on the transparent electrode. The bus electrode has a width of 50 μm and a thickness of 2 μm and it has been formed, in the conventional electrode production process, according to the screen printing method in which a bus electrode is formed as a thick layer of an Ag paste or an electrode pattern-forming technique in which a film is formed on the entire surface by the sputtering technique and then an electrode pattern is formed by the photolithography technique using a resist film. On the other hand, the electrode for the back panel is called "an address electrode" and it is directly formed on a glass plate at a density of 3 linear electrodes per one picture element for 1024 picture elements. The address electrode has a width of 50 μm and a thickness of 2 μm and it is formed according to the screen printing method or the sputtering-photolithography technique like the scanning electrode. A dielectric glass layer is formed on the both scanning and address electrodes.

Both of the front and back panels are subjected to subsequent steps commonly employed and then bonded together to thus complete a PDP panel. Among the steps required for the production of such a PDP panel, the steps for forming the electrodes are the most complicated ones and require the use of a large number of steps. This becomes a major obstacle in the reduction of the production cost.

As methods for preparing the foregoing dispersion of metal ultrafine particles, there have been known, for instance, those that comprise the steps of blending metal ultrafine particles or powder with a solvent, a resin and/or a dispersant and then dispersing the particles by, for instance, stirring the mixture, applying of ultrasonics thereto, and treating of the mixture with, for instance, a ball mill or sand mill to thus give a desired dispersion of metal ultrafine particles. The dispersions prepared according to these methods have been used in the fields of, for instance, paints and the like. For instance, there have been known those for directly preparing metal ultrafine particles in a vapor phase such as a vapor phase-evaporation method (Japanese Patent No. 2,561,537) in which a metal is evaporated in a vapor phase in the coexistence of solvent vapor, the evaporated metal is condensed into uniform ultrafine particles to disperse them in the solvent and to thus form a dispersion and those, which make use of an insoluble precipitate-forming reaction or a reducing reaction using a reducing agent. Among these methods for preparing a dispersion of metal ultrafine particles, the vapor phase-evaporation method permits the stable preparation of a dispersion in which ultrafine particles having a particle size of not more than 100 nm are uniformly dispersed and requires the use of a dispersion stabilizer or a resin component in an amount smaller than that required for the liquid phase-production methods in order to prepare such a dispersion of metal ultrafine particles having a predetermined concentration.

As has been discussed above, the dispersion of metal ultrafine particles has never been used as the ink for ink jet printer or ink jet printing (system). This is because the conventional dispersions of metal ultrafine particles did not have sufficient characteristic properties (such as viscosity and surface tension) required for making the dispersions usable in the ink for the ink jet printing. The metal ultrafine particles produced according to the conventional vapor phase-evaporation method undergo coalescence. Therefore, if they are dispersed in a solvent, they never provide any stable dispersion. For this reason, when such a dispersion of metal ultrafine particles is used as ink for the inkjet printing, a problem arises such that aggregates of metal ultrafine particles present therein would cause clogging of the nozzle for inkjet printing. Moreover, even in a dispersion comprising metal ultrafine particles independently dispersed therein, it is required for the preparation of such a dispersion to use a solvent that can satisfy the requirements for ink or possesses the required ink-characteristics, but it has been quite difficult to select such an appropriate solvent.

Moreover, in the conventional vapor phase-evaporation method, the coexisting solvent forms by-products due to the denaturation or modification thereof upon the condensation of the metal vapor and accordingly, the method sometimes suffers from such problems as those concerning the storage life, stability with time, viscosity and coloration of the resulting dispersion, depending on the amount of the by-products. In addition, as will be detailed below, it is necessary to prepare a dispersion of metal ultrafine particles in, for instance, a low boiling point solvent, water and alcoholic solvents, the use of which is difficult in the steps of the vapor phase-evaporation method, depending of the applications of the resulting dispersion.

According to the conventional method for the production of PDP, the front panel and the back panel are produced in separate steps and they are ultimately assembled to give a PDP panel.

The steps for producing the front panel will first be described below. After a test for examining acceptability of glass plates, an ITO pattern serving as scanning electrodes is formed by the sputtering and photolithography techniques. Since the ITO film in itself has a high resistance value, a metal film having a width of 50 μm and a thickness of 2 μm is formed as a bus electrode. At present, there have been known two methods for forming such a metal film, i.e., the screen printing method for forming a thick Ag paste layer and a method comprising the step of etching a Cr/Cu/Cr laminated sputter film into a pattern according to the photolithography technique. After the formation of the bus electrode, a dielectric glass layer and an MgO layer are formed on the bus electrode pattern in this order and the front panel is thus ready for the assembly with the back panel.

Next, the steps for producing the back panel will be described below. After a test for examining acceptability of glass plates, an address electrode is formed. As methods for producing the address electrode, there have been known two methods as in case of the production of the front panel, i.e., the screen printing method for forming a thick Ag paste layer and a method comprising the step of etching a Cr/Cu/Cr laminated sputter film into a pattern according to the photolithography technique. After the formation of the address electrode, a dielectric glass layer, a stripe barrier rib, and a layer of a fluorescent substance are formed on the address electrode in this order and the back panel is thus ready for the assembly with the front panel. In the assembling step, these two panels are tightly bonded together, followed by evacuation of the space between these panels, the enclosure of a gas therein and then an aging treatment to thus complete a PDP panel.

However, the screen printing method used in the foregoing electrode-forming process suffers from problems such as defects concerning the electrode-forming position due to any slippage of the screen, open defects due to insufficient patterning, which is in turn caused due to the clogging of the screen and loss of material due to the paste remaining on the screen. The sputtering-photolithography technique is a vacuum process and requires pattern-etching procedures according to the photolithography. Therefore, this technique requires the use of 6 to 7 steps such as sputtering, application of a resist, irradiation of patterned light, development, etching and resist-ashing steps and a problem also arises such that the loss in material is large since a film is formed on the whole surface of the plate.

Accordingly, an object of the present invention is to solve the foregoing problems associated with the conventional techniques and more specifically to provide a method for forming electrodes for FPD using ink for the inkjet printing, which consists of a dispersion of metal ultrafine particles independently dispersed therein and which is prepared in such a manner that the dispersion has sufficient characteristic properties required for use in the ink for the ink jet printing, and an ink jet printer.

DISCLOSURE OF THE INVENTION

The inventors of this invention have conducted various studies to achieve the foregoing object of the present invention or to develop a dispersion containing metal ultrafine particles in which the metal ultrafine particles are independently dispersed, i.e. an independent metal ultrafine particle dispersion, which is free of any aggregate of ultrafine particles, maintains its excellent flowability and is excellent in ink characteristic properties. As a result, the invertors have found that the problems associated with the conventional techniques can effectively be solved by providing a dispersion prepared using specific steps and specific dispersants. Moreover, the inventors of this invention have further variously investigated the formation of electrodes for PDP, have found that the use of ink consisting of the foregoing dispersion of independently dispersed metal ultrafine particles capable of being fired at a low temperature on the order of about 300° C. and a multi-head ink jet printer permits the elimination or solution of such problems as the loss in materials observed in, for instance, the sputtering and screen printing techniques, the necessity of a vacuum batch treatment used in, for instance, the sputtering technique, the formation of defects concerning pattern-forming position due to slippage of the screen observed in, for instance, the screen printing technique and the formation of open defects due to the clogging of screen meshes, also permits the formation of a desired electrode pattern within a short period of time, and have thus completed the present invention.

The method for the formation of electrodes for flat panel display devices according to the present invention employs a specific ink for ink jet printing and this ink for ink jet printing consists of a dispersion containing metal ultrafine particles independently dispersed therein and a dispersant. The dispersion of independently dispersed metal ultrafine particles containing a dispersant comprises ultrafine particles independently and uniformly dispersed therein and thus, the dispersion maintains its excellent flowability.

The particle size of these metal ultrafine particles is in general not more than 100 nm and preferably not more than 10 nm. The dispersion of independently dispersed metal ultrafine particles has a viscosity ranging from 1 to 100 mPa·s and preferably 1 to 10 mPa·s and a surface tension ranging from 25 to 80 mN/m and preferably 30 to 60 mN/m. Thus, the dispersion having such physical properties would satisfy the requirements for making the dispersion usable as ink for ink jet printing.

The dispersant usable herein is at least one member selected from the group consisting of alkylamines, carboxylic acid amides and salts of aminocarboxylic acids. In particular, the main chain of the alkylamine has 4 to 20 carbon atoms and preferably 8 to 18 carbon atoms and the alkylamine is preferably a primary amine.

The foregoing dispersion preferably comprises, as a dispersion medium, at least one solvent selected from the group consisting of non-polar hydrocarbons whose main chain has 6 to 20 carbon atoms, water and alcoholic solvents having not more than 15 carbon atoms.

The ink for ink jet printing used in the present invention can be prepared by a method comprising the first step of evaporating a metal in a gas atmosphere in the presence of the vapor of the first solvent to thus give a dispersion of metal ultrafine particles dispersed in the first solvent; the second step of adding a low molecular weight polar solvent, as the second solvent, to the dispersion prepared in the first step to thus precipitate the metal ultrafine particles and removing the resulting supernatant to thus substantially remove the first solvent; and the third step of adding the third solvent to the precipitates thus prepared to give a dispersion of independently dispersed metal ultrafine particles. The foregoing dispersant is added to the system during or in the first and/or third steps.

Moreover, the method for preparing ink for ink jet printing used in the present invention comprises the first step of evaporating a metal in a gas atmosphere in the presence of the vapor of the first solvent to thus bring the metal vapor into contact with the vapor of the first solvent and then cooling and collecting the vapor mixture to give a dispersion containing metal ultrafine particles dispersed in the first solvent; the second step of adding a low molecular weight polar solvent, as the second solvent, to the dispersion prepared in the first step to thus precipitate the metal ultrafine particles and removing the resulting supernatant to thus substantially remove the first solvent; and the third step of adding the third solvent to the precipitates thus prepared to give a dispersion of independently dispersed metal ultrafine particles. The addition of the foregoing dispersant in the first and/or third steps would permit the preparation of a dispersion of independently dispersed metal ultrafine particles, which is suitable for use as ink for ink jet printing.

In the case of the ink for ink jet printing, the third solvent is preferably at least one member selected from the group consisting of non-polar hydrocarbons having 6 to 20 carbon atoms in the main chain thereof, water and alcoholic solvents (having not more than 15 carbon atoms).

BEST MODE FOR CARRYING OUT THE INVENTION

Embodiments of the present invention will be described in detail below.

With regard to characteristic properties required for the ink for ink jet printing, the ink should have a viscosity ranging from 1 to 100 mPa·s and preferably 1 to 10 mPa·s and a surface tension ranging from 25 to 80 mN/m and preferably 30 to 60 mN/m at the usual operating temperature (ranging from 0 to 50° C.) in order to ensure the stable supply of ink, the stable droplet-forming ability and the flight stability of the ink drops, and the fast responsibility of the printer head. The dispersion of the present invention satisfies these requirements for the ink used in ink jet printing.

As has been described above, the metal ultrafine particles used in the present invention can be prepared according to the vapor phase-evaporation method and this method permits the preparation of metal ultrafine particles having uniform particle size on the order of not more than 100 nm and preferably 10 nm. In the present invention, such metal ultrafine particles are used as a raw material and the solvent substitution is carried out so that the metal ultrafine particles can suitably be used in the ink for ink jet printing. Moreover, a dispersant is added to the dispersion of such ultrafine particles to improve the dispersion stability of these ultrafine particles in the dispersion. Accordingly, the resulting dispersion can thus suitably be used as the ink for ink jet printing in which the metal ultrafine particles are independently, individually and uniformly dispersed therein and which maintains its excellent flowability.

According to the present invention, when preparing a desired dispersion of metal ultrafine particles using the metal ultrafine particles prepared by the vapor phase-evaporation technique, a metal is first evaporated, in the first step, in a vacuum in an atmosphere whose inert gas pressure, for instance, He gas pressure is controlled to a level of not more than 10 Torr, the vapor of at least one first solvent is introduced into the vacuum chamber when cooling and collecting the vapor of the evaporated metal so that the vapor of the first solvent is brought into contact with the surface of metal particles during glowing to thus obtain a dispersion in which the resulting primary particles of the metal are independently and uniformly dispersed in the first solvent in a colloidal state and the first solvent is removed in the subsequent second step. The reason why the first solvent is removed is to eliminate the by-products formed through the denaturation or modification of the coexisting first solvent when the evaporated metal vapor undergoes condensation in the first step and is to prepare a dispersion of metal ultrafine particles independently dispersed in a solvent such as a low boiling point solvent, water or an alcoholic solvent, which cannot be used in the first step without any difficulty, depending on the applications of the dispersion.

According to the present invention, in the second step, a low molecular weight polar solvent as the second solvent is added to the dispersion prepared in the first step to thus precipitate the metal ultrafine particles included in the dispersion and then the resulting supernatant is removed by, for instance, a technique in which the dispersion is allowed to stand or the decantation technique to thus remove the first solvent used in the first step. The second step is repeated several times to thus substantially remove the first solvent from the dispersion. Subsequently, in the third step, the solvent substitution is carried out by the addition of the fresh third solvent to the precipitates obtained in the second step to thus obtain a desired dispersion of metal ultrafine particles. Thus, there can be prepared a dispersion containing independently dispersed metal ultrafine particles having a particle size of not more than 100 nm.

According to the present invention, the dispersant may, if necessary, be added to the dispersion system in the first and/or third steps. When the dispersant is used in the third step, it is possible to use even a dispersant, which is not soluble in the solvent used in the first step.

The dispersant usable in the present invention is not restricted to any specific one, but examples thereof are at least one member selected from the group consisting of alkylamines, carboxylic acid amides and salts of aminocarboxylic acid. In particular, the alkylamine is preferably one whose main chain or skeleton has 4 to 20 carbon atoms and more preferably one whose main chain has 8 to 18 carbon atoms, from the viewpoint of the stability and the easy handling ability. If the main chain of the alkylamine has less than 4 carbon atoms, the basicity of the amine is extremely strong, and thus it has such a tendency that it corrodes the metal ultrafine particles and ultimately solubilize the metal ultrafine particles. On the other hand, if the main chain of the alkylamine has more than 20 carbon atoms, the resulting dispersion may have an increased viscosity when increasing the concentration of the metal ultrafine particles present in the dispersion and thus this makes the handling ability thereof slightly poor. In this connection, all of the primary to tertiary alkylamines can be used as the dispersants in the present invention, but preferred are the primary alkylamines because of their excellent stability and easy handling ability.

Specific examples of alkylamines usable in the present invention include primary amines such as butylamine, octylamine, dodecyl amine, hexadodecyl amine, octadecylamine, cocoamine, tallow amine, hydrogenated tallow amine, oleylamine, laurylamine and stearylamine; secondary amines such as di-cocoamine, dihydrogenated tallow amine and distearylamine; tertiary amines such as dodecyl dimethylamine, di dodecyl monomethyl amine, tertadecyl dimethylamine, octadecyl dimethylamine, coco-dimethylamine, dodecyl tertadecyl dimethylamine and trioctylamine; and other amines, for instance, diamines such as naphthalene diamine, stearoyl propylene diamine, octamethylene diamine and nonane diamine. In addition, specific examples of carboxylic acid amides and salts of aminocarboxylic acids are stearic acid amide, palmitic acid amide, lauric acid laurylamide, oleic acid amide, oleic acid diethanol amide, oleic acid laurylamide, stearanilide and oleylaminoethyl glycine. These alkylamines, carboxylic acid amides and salts of aminocarboxylic acids may be used alone or in any combination and they can serve as more stable dispersants.

According to the present invention, the content of the alkylamine in the dispersion ranges from about 0.1 to 10 wt % and desirably 0.2 to 7 wt % on the basis of the total weight of the metal ultrafine particles. If the content thereof is less than 0.1 wt %, the metal ultrafine particles are not individually or independently dispersed in the dispersion, aggregates thereof are formed and the resulting dispersion is insufficient in the dispersion stability. On the other hand, if it exceeds 10 wt %, the resulting dispersion has a high viscosity and gel-like substances are ultimately formed.

The foregoing dispersion of metal ultrafine particles may be used for forming an electrode of FPD. According to the present invention, such an FPD electrode can be formed by the use of the dispersion as an ink composition, in particular, as the ink for use in ink jet printers, which are not expensive, has high quality and has recently widely been used as a peripheral device of personal computers. These physical properties such as viscosity and surface tension required for the ink for ink jet printing have already been described above. Moreover, in some cases, conditions for selecting a solvent to be used may vary depending on, for instance, the applications of the ink. For instance, a polar solvent such as water or an alcoholic solvent or a non-polar hydrocarbon solvent may be selected depending on the characteristic properties of the base material to be printed such as a glass substrate or a plastic one.

For instance, the first solvent is one for forming metal ultrafine particles according to the vapor phase-evaporation technique and therefore, it has a relatively high boiling point so that it can easily be liquefied when collecting the resulting metal ultrafine particles through cooling. Examples of the first solvents include a solvent containing at least one alcohol having not less than 5 carbon atoms such as terpineol, citronellol, geraniol, phenethyl alcohol, or a solvent containing at least one organic ester such as benzyl acetate, ethyl stearate, methyl oleate, ethyl phenylacetate and glycerides, which may appropriately be selected depending on the elements constituting the metal ultrafine particles used or the applications of the resulting dispersion.

The second solvent may be one capable of precipitating the metal ultrafine particles included in the dispersion prepared in the first step and capable of extracting and separating the first solvent to thus remove the same and may be, for instance, a low molecular weight polar solvent such as acetone.

Moreover, the third solvent usable herein may, for instance, be selected from those in the liquid state at ordinary temperature such as non-polar hydrocarbons whose main chain has 6 to 20 carbon atoms, water and alcohols having not more than 15 carbon atoms. If using a non-polar hydrocarbon solvent whose main chain has less than 6 carbon atoms, the resulting dispersion or ink is dried too fast to ensure the handling ability thereof, while if the carbon atom number of the main chain exceeds 20, the viscosity of the resulting dispersion is extremely high and carbon is apt to remain on a substrate when the dispersion is used in an application in which the dispersion is fired. Moreover, if the carbon atom number of the alcohol exceeds 15, the viscosity of the resulting dispersion is extremely high and carbon is apt to remain on a substrate when the dispersion is used in an application in which the dispersion is fired.

Examples of the third solvents usable herein are long chain alkanes such as hexane, heptane, octane, decane, undecane, dodecane, tridecane and trimethyl pentane; cycloalkanes such as cyclohexane, cycloheptane and cyclooctane; aromatic hydrocarbons such as benzene, toluene, xylene, trimethyl benzene and dodecyl benzene; and alcohols such as hexanol, heptanol, octanol, decanol, cyclohexanol and terpineol. These third solvents may be used alone or in the form of a mixed solvent. For instance, the third solvent may be mineral spirit, which is a mixture of long chain alkanes.

The third solvent must sometimes differ from the solvent used in the first step (for instance, a solvent identical to that used in the first step, but different from the same in purity). The present invention is suitably applied to such a case.

The element constituting the metal ultrafine particles used in the present invention is not restricted to any specific one inasmuch as it is a highly conductive metal and may appropriately be selected depending on various purposes. Examples thereof include at least one member selected from the group consisting of gold, silver, copper, palladium, and other various kinds of conductive metals or an alloy thereof. Among these metals, preferred are silver and copper because of their high conductivity. At least one member selected from the group consisting of alkylamines, carboxylic acid amides and salts of aminocarboxylic acids listed above may serve as a dispersant for all of the metal ultrafine particles formed from the foregoing elements and permits the preparation of a desired dispersion containing such metal ultrafine particles.

In the present invention, the concentration of metal ultrafine particles in the ink for ink jet printing, which is used for forming an electrode of FPD, ranges from 10 to 70 wt % and preferably 10 to 50 wt %. This is because if the concentration thereof is less than 10 wt %, the resulting dispersion sufficiently satisfies the requirements for ink such as the viscosity and the surface tension, but the electric resistance achieved after firing the coated dispersion is insufficient for use as a conductive circuit, while if it exceeds 70 wt %, the resulting dispersion never satisfies the requirements for ink such as the viscosity and the surface tension. Therefore, the dispersion cannot be used as the ink for inkjet printing for forming the FPD electrode.

The present invention will hereunder be described with reference to the following Examples. The following Examples are herein given simply for illustrating the present invention and the present invention is not restricted to these specific Examples at all.

EXAMPLE 1

When producing silver (Ag) ultrafine particles according to the vapor phase-evaporation technique in which Ag was evaporated at a He gas pressure of 0.5 Torr, the Ag ultrafine particles during growing were brought into contact with the vapor of a 20:1 (volume ratio) mixture of a-terpineol and octylamine and the vapor mixture was cooled and collected to obtain an Ag ultrafine particle-dispersion comprising Ag ultrafine particles having an average particle size of 8 nm and independently dispersed in a-terpineol solvent, in an amount of 25 wt %. To one volume of this dispersion, there were added 5 volumes of acetone and then the mixture was stirred. The ultrafine particles present in the dispersion were precipitated due to the action of the acetone as a polar solvent. After allowing the mixture to stand over 2 hours, the supernatant was removed, followed by again addition of the same amount of acetone to the precipitates thus obtained, stirring the mixture, allowing the same to stand over 2 hours and subsequent removal of the resulting supernatant. To the resulting precipitates, there was added dodecane as a non-polar hydrocarbon solvent, followed by stirring the mixture. At this stage, it was confirmed that the precipitated Ag ultrafine particles had a particle size of about 8 nm and were completely independently dispersed in the dodecane. This dispersion was quite stable and there was not observed any precipitation or separation of these ultrafine particles even after the storage thereof at ordinary temperature over one month. The content of Ag in the dispersion, the viscosity of the dispersion and the surface tension thereof were found to be 23 wt %, 8 mPa·s and 35 mN/m, respectively.

Similarly, when producing copper (Cu) ultrafine particles according to the vapor phase-evaporation technique in which Cu was evaporated at a He gas pressure of 0.5 Torr, the Cu ultrafine particles during growing were brought into contact with the vapor of a 20:1 (volume ratio) mixture of α-terpineol and octylamine and the vapor mixture was cooled and collected to obtain a Cu ultrafine particle-dispersion comprising Cu ultrafine particles having an average particle size of 7 nm and independently dispersed in a-terpineol as a solvent, in an amount of 27 wt %. To one volume of this dispersion, there were added 5 volumes of acetone and then the mixture was stirred. The ultrafine particles present in the dispersion were precipitated due to the action of the acetone as a polar solvent. After allowing the mixture to stand over 2 hours, the supernatant was removed, followed by again addition of the same amount of acetone to the precipitates thus obtained, stirring the mixture, allowing the same to stand over 2 hours and subsequent removal of the resulting supernatant. To the resulting precipitates, there was added dodecane as a non-polar hydrocarbon solvent, followed by stirring the mixture. At this stage, it was confirmed that the precipitated Cu ultrafine particles had a particle size of about 7 nm and were completely independently dispersed in the dodecane. This dispersion was quite stable and there was not observed any precipitation or separation of these ultrafine particles even after the storage thereof at ordinary temperature over one month. The content of Cu in the dispersion, the viscosity of the dispersion and the surface tension thereof were found to be 25 wt %, 9 mPa·s and 37 mN/m, respectively.

The dispersion of independently dispersed Cu ultrafine particles thus obtained was added to the foregoing dispersion of independently dispersed Ag ultrafine particles in such an amount that the rate of Cu in the metal component of the resulting mixture was 10 wt %. A fine line having a width of 50 μm, a coated thickness of 60 μm and a length of 100 mm was drawn on a borosilicate glass substrate using the ink prepared above and a commercially available inkjet printer equipped with a piezoelectric type single nozzle. After drawing the fine line, the substrate was fired at 300° C. for 30 minutes in an electric furnace. As a result, an electrode wiring having a width of 50 μm and a thickness of 2.5 μm could be formed and the specific resistance of the wiring was found to be $9.0 \times 10^{-6}$ ohm·cm. In addition, this electrode wiring was inspected for the adhesion by the tape-peeling test and it was found that the electrode wiring could not be peeled off from the substrate even at a peel strength of 4.5 kgf/mm$^2$ and accordingly, the electrode wiring was found to have high adhesion.

Then, the scanning electrode for the front panel of a 42-type color PDP panel for high vision having an image plane ratio of 16:9 was formed using the ink of metal ultrafine particles and an ink jet printer provided with 512 multi-nozzle arranged at a pitch of 510 μm installed on a large-scale X-Y table having an absolute positioning precision of ±10 μm. Separately, the address electrode was formed on the back panel of the color PDP using an ink jet printer equipped with 512 multi-nozzle arranged at a pitch of 900 μm installed on a table similar to that used above, followed by assembling these front and back panels into a PDP panel. These electrode-forming processes and panel-assembling processes will be detailed below.

The 42-type color PDP panel having an image plane ratio of 16:9 has a diagonal length of 1060 mm and the number of picture elements of 1024 for the both front and back panels, and the number of the scanning electrodes formed on the front panel is 1024×2 lines, while the number of the address electrodes formed on the back panel is 1024×3 lines (RGB). The electrode pitch is 510 μm for the scanning electrode and 900 μm for the address electrode. The width and thickness of these electrodes are 50 μm and 2 μm, respectively. The printer is controlled such that 5 to 6 pL of ink is injected at a frequency of 14.4 KHz through each nozzle. The ink used in this case was prepared by adding the dispersion of Cu ultrafine particles to the dispersion of Ag ultrafine particles in such a manner that the rate of Cu in the metal component of the resulting mixture was 10 wt %.

First of all, to form a bus electrode for the scanning electrode, borosilicate glass substrates on which ITO electrodes had been formed by the conventional process and having a diagonal length of 1060 mm, a thickness of 2.8 mm and an aspect ratio of 16:9 (oblong shape) were robot-transported to a predetermined area or position on the X-Y table of a drawing apparatus, followed by adsorbing the substrate on the table through evacuation to thus fix the substrate to the table. After precisely positioning the glass substrate on the basis of the markers for positioning previously printed on the four corners of the substrate, lines were drawn on the glass substrate along the longitudinal direction thereof while remaining spaces of 15 mm width each for forming leading electrodes on the both sides of the glass substrate. When injected on the substrate, the ink was extended thereon like a circular shape having a diameter of about 50 μm and dried instantaneously. To ensure the formation of a film having a thickness of 2 μm as determined after firing, using this ink having the foregoing concentration, the scanning speed of the head was adjusted to (50/3)/(1/14400) μm/sec=239.9 mm/sec so that the circles drawn by every injection overlap by ⅔ between each neighboring circles in the scanning direction of the head (along the direction of the X-axis). The head was scanned in the direction of the X-axis to complete the drawing of 512 lines, it was then shifted 200 μm towards the Y-axis and scanned to draw 512 lines to thus complete the drawing of 512×2 electrode lines or paired electrodes for 512 picture elements. Thereafter, the head was shifted about 261 mm towards the Y-axis to similarly draw paired electrodes for 512 picture elements. It took about 15 seconds to draw 1024×2 scanning electrodes on the front panel. Finally, the head was shifted to each edge of the substrate and leading electrodes were formed over about 5 seconds while adjusting the combination of injected ink through each of the 512 nozzles. It took about 60 seconds to complete all of the foregoing steps of the transportation of the glass substrate to the drawing apparatus, the adsorption thereof through evacuation, the positioning, the drawing of the electrodes, the drawing of the leading electrodes and the withdrawal of the product from the apparatus. This corresponded to ¹⁄₁₀₀₀ time of that required for the sputtering technique. The change in weight of the cartridge was determined and it was found that the amount of ink required for the formation of the bus electrode on the front panel was equal to 1.84 g as expressed in terms of the reduced weight of the metal. This corresponded to about ⅕ time of the amount of the material required for the sputtering technique. Moreover, it was confirmed that any defect was not generated on the drawn lines if the drawing apparatus was sufficiently maintained and repaired.

A dielectric glass material was applied onto the whole surface of the substrate through the dried and drawn electrodes in a thickness of about 40 μm using a screen printing machine and the coated substrate was fired in a belt furnace maintained at a temperature of 600° C. in the open air while controlling the conveying speed of the substrate to such a level that the retention time of the substrate in the furnace was set at 30 minutes.

The address electrodes on the back panel were directly formed on a glass substrate at a pitch of 900 μm according to the same procedures as used for forming the scanning electrodes. An operation of drawing 512 electrode lines was repeated 6 times to thus form address electrodes of 1024×3 lines. It took about 13 seconds for the formation of these address electrodes. Regarding the process for forming the electrodes on the back panel, it likewise took about 60 seconds to complete all of the steps from the transportation of the substrate to the withdrawal thereof as in the case of the front panel and in this case, the time required for the process could be reduced to 1/1000 time of that required for the sputtering technique.

The change in weight of the cartridge was examined and as a result, the amount of the ink required for forming the address electrodes on the back panel was found to be 1.62 g as expressed in terms of the reduced weight of the metal. Moreover, it was confirmed that any defect was not observed on the drawn lines. A dielectric glass material was applied onto the resulting address electrodes according to the same procedures as used above in connection with the scanning electrodes and then the substrate was fired in a belt furnace like the scanning electrodes.

Then both of the front and back panels on which the electrodes had been formed by the foregoing procedures were treated according to the usual production process or they are adhered and sealed together, followed by evacuation of the space formed between these front and back panels, enclosure of a gas within the space, and an aging treatment of these panels to thus assemble them into a PDP panel. The resulting panel was subjected to a continuous lighting up test over 1000 hours and as a result, it was confirmed that the electrodes were sufficient in the durability. In addition, when comparing this panel with those produced according to the conventional techniques, there was not observed any difference, at all, in the images formed.

INDUSTRIAL APPLICABILITY

According to the present invention, electrodes of FPD are formed using ink for ink jet printing, which consists of a dispersion containing independently dispersed metal ultrafine particles and a dispersant and an ink jet printer. Accordingly, materials are efficiently used without waste and the production process can be shortened or simplified and this in turn leads to the saving of the production cost.

What is claimed is:

1. A method for forming electrodes for a flat panel display device comprising the step of forming electrodes for a flat panel display device using ink for ink jet printing, which consists of a dispersion containing metal ultrafine particles independently dispersed therein and a dispersant, wherein the dispersion is prepared by a method comprising the first step of evaporating a metal in a gas atmosphere in the presence of the vapor of the first solvent to thus give a dispersion of metal ultrafine particles dispersed in the first solvent; the second step of adding a low molecular weight polar solvent as the second solvent to the dispersion prepared in the first step to thus precipitate the metal ultrafine particles and removing the resulting supernatant to thus substantially remove the first solvent; and the third step of adding a third solvent to the precipitates thus prepared to give a dispersion of independently dispersed metal ultrafine particles, wherein the third solvent is not a residual solvent.

2. The method for forming electrodes of a flat panel display device as set forth in claim 1, wherein the dispersant is added in at least one of the first step and the third step.

3. The method for forming electrodes of a flat panel display device as set forth in claim 1, wherein the particle size of the metal ultrafine particles is not more than 100 nm, the viscosity of the dispersion of independently dispersed metal ultrafine particles ranges from 1 to 100 mPa·s and the surface tension thereof ranges from 25 to 80 mN/m.

4. The method for forming electrodes of a flat panel display device as set forth in claim 1, wherein the dispersant is at least one member selected from the group consisting of alkylamines, carboxylic acid amides and salts of aminocarboxylic acids.

5. The method for forming electrodes of a flat panel display device as set forth in claim 3, wherein the dispersant is at least one member selected from the group consisting of alkylamines, carboxylic acid amides and salts of aminocarboxylic acids.

6. The method for forming electrodes of a flat panel display device as set forth in claim 4, wherein the main chain of the alkylamine has 4 to 20 carbon atoms.

7. The method for forming electrodes of a flat panel display device as set forth in claim 5, wherein the main chain of the alkylamine has 4 to 20 carbon atoms.

8. The method for forming electrodes of a flat panel display device as set forth in claim 4, wherein the alkylamine is a primary alkylamine.

9. The method for forming electrodes of a flat panel display device as set forth in claim 5, wherein the alkylamine is a primary alkylamine.

10. The method for forming electrodes of a flat panel display device as set forth in claim 1, wherein the dispersion comprises, as a dispersion medium, at least one member selected from the group consisting of non-polar hydrocarbons whose main chain has 6 to 20 carbon atoms, water and alcoholic solvents having not more than 15 carbon atoms.

11. The method for forming electrodes of a flat panel display device as set forth in claim 3, wherein the dispersion comprises, as a dispersion medium, at least one member selected from the group consisting of non-polar hydrocarbons whose main chain has 6 to 20 carbon atoms, water and alcoholic solvents having not more than 15 carbon atoms.

12. The method for forming electrodes of a flat panel display device as set forth in claim 4, wherein the dispersion comprises, as a dispersion medium, at least one member selected from the group consisting of non-polar hydrocarbons whose main chain has 6 to 20 carbon atoms, water and alcoholic solvents having not more than 15 carbon atoms.

13. The method for forming electrodes of a flat panel display device as set forth in claim 6, wherein the dispersion comprises, as a dispersion medium, at least one member selected from the group consisting of non-polar hydrocarbons whose main chain has 6 to 20 carbon atoms, water and alcoholic solvents having not more than 15 carbon atoms.

14. The method for forming electrodes of a flat panel display device as set forth in claim 8, wherein the dispersion comprises, as a dispersion medium, at least one member selected from the group consisting of non-polar hydrocarbons whose main chain has 6 to 20 carbon atoms, water and alcoholic solvents having not more than 15 carbon atoms.

* * * * *